United States Patent
Jacobson et al.

(10) Patent No.: US 8,422,254 B2
(45) Date of Patent: Apr. 16, 2013

(54) VOLTAGE SOURCE CONVERTER

(75) Inventors: Björn Jacobson, Grängesberg (SE);
Gunnar Asplund, Ludvika (SE)

(73) Assignee: ABB Technology AG, Zurich (CH)

( * ) Notice: Subject to any disclaimer, the term of this patent is extended or adjusted under 35 U.S.C. 154(b) by 354 days.

(21) Appl. No.: 12/991,207

(22) PCT Filed: May 7, 2008

(86) PCT No.: PCT/EP2008/055612
§ 371 (c)(1),
(2), (4) Date: Dec. 3, 2010

(87) PCT Pub. No.: WO2009/135528
PCT Pub. Date: Nov. 12, 2009

(65) Prior Publication Data
US 2011/0103115 A1    May 5, 2011

(51) Int. Cl.
*H02M 5/45* (2006.01)
(52) U.S. Cl.
USPC .............................. 363/37; 363/132
(58) Field of Classification Search .............. 363/34–41,
363/43, 65, 68, 71, 127, 132, 135, 136, 141,
363/144; 307/82, 83, 107, 71, 37, 105; 323/265
See application file for complete search history.

(56) References Cited

U.S. PATENT DOCUMENTS

| | | | |
|---|---|---|---|
| 5,642,275 A | 6/1997 | Peng et al. | |
| 5,734,565 A * | 3/1998 | Mueller et al. | 363/132 |
| 6,028,779 A * | 2/2000 | Sakamoto et al. | 363/55 |
| 6,151,201 A | 11/2000 | Asplund et al. | |
| 6,954,366 B2 * | 10/2005 | Lai et al. | 363/71 |
| 7,542,317 B2 * | 6/2009 | Azuma et al. | 363/131 |
| 8,339,823 B2 * | 12/2012 | Jacobson et al. | 363/144 |
| 8,345,457 B2 * | 1/2013 | Asplund et al. | 363/132 |
| 2008/0232145 A1 | 9/2008 | Hiller et al. | |
| 2010/0027177 A1 | 2/2010 | Huang et al. | |

FOREIGN PATENT DOCUMENTS

| | | |
|---|---|---|
| DE | 101 03 031 A1 | 7/2002 |
| DE | 10 2006 046 040 A1 | 4/2008 |
| WO | WO 2007/023064 A1 | 3/2007 |
| WO | WO 2007/028349 A1 | 3/2007 |

OTHER PUBLICATIONS

Jacobson et al., "HVDC With Voltage Source Converters and Extruded Cables for up to ±300 kV and 1000 MW", CIGRE Session, Aug. 27, 2006, Paris, France, pp. 1-8, XP-002512983.

* cited by examiner

*Primary Examiner* — Rajnikant Patel
(74) *Attorney, Agent, or Firm* — Birch, Stewart, Kolasch & Birch, LLP

(57) ABSTRACT

A Voltage Source Converter having at least one phase leg connected to opposite poles of a direct voltage side of the converter and comprising a series connection of switching cells has inductance means comprising a plurality of inductors (23) built in in said series connection of switching cells (7') and connected in series with these cells by being connected to terminals (14, 15) thereof.

20 Claims, 5 Drawing Sheets

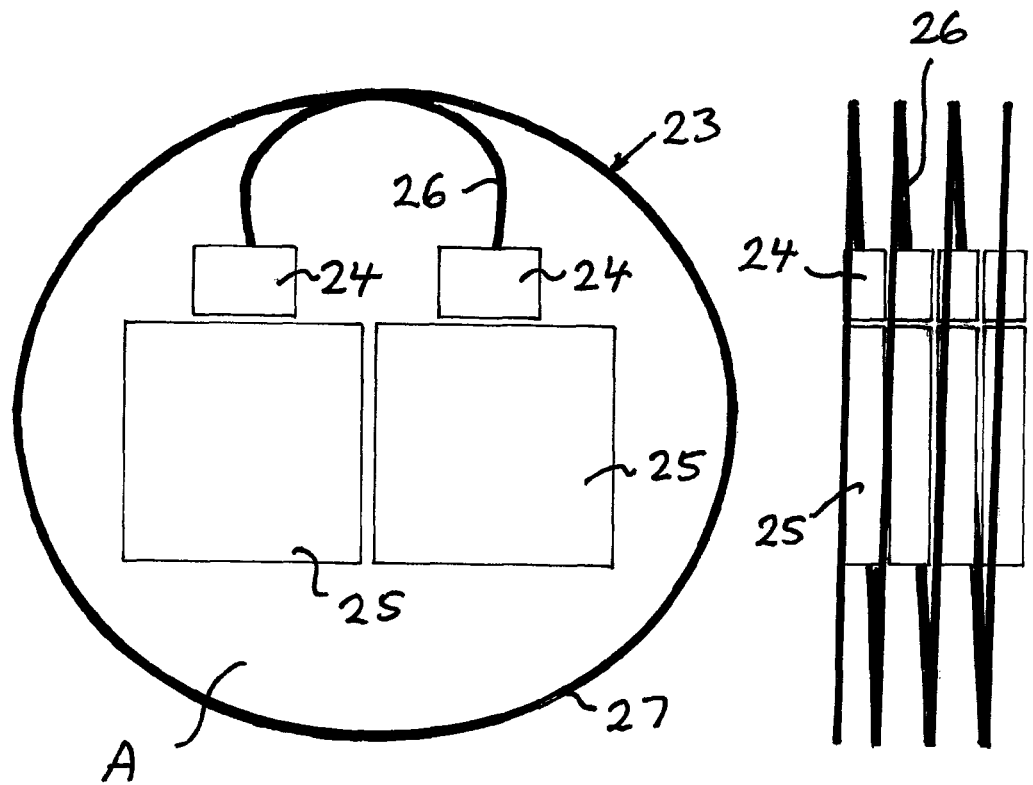
Fig 7
Fig 9
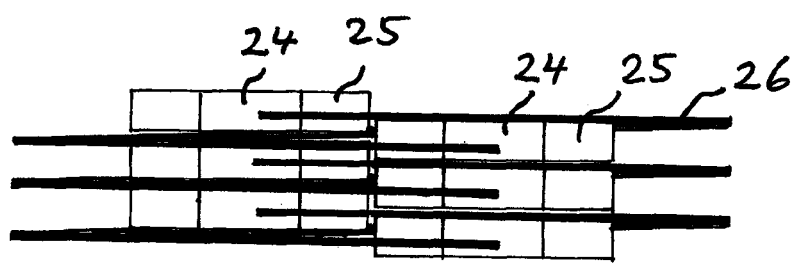
Fig 8

VOLTAGE SOURCE CONVERTER

TECHNICAL FIELD OF THE INVENTION AND BACKGROUND ART

The present invention relates to a Voltage Source Converter having at least one phase leg connecting to opposite poles of a direct voltage side of the converter and comprising a series connection of switching cells, each said switching cell having on one hand at least two semiconductor assemblies connected in series and having each a semiconductor device of turn-off type and a free wheeling diode connected in parallel therewith and on the other at least one energy storing capacitor as well as two terminals connecting the cell to adjacent cells in said series connection of switching cells, a mid point of said series connection of switching cells forming a phase output being configured to be connected to an alternating voltage side of the converter, each said switching cell being configured to obtain two switching states by control of said semiconductor devices of each switching cell, namely a first switching state and a second switching state, in which the voltage across said at least one energy storing capacitor and a zero voltage, respectively, is supplied across said two terminals of the switching cell, for obtaining a determined alternating voltage on said phase output, in which said series connection of switching cells includes inductance means.

Such converters with any number of said phase legs are comprised, but they have normally three such phase legs for having a three phase alternating voltage on the alternating voltage side thereof.

A Voltage Source Converter of this type may be used in all kinds of situations, in which direct voltage is to be converted into alternating voltage and conversely, in which examples of such uses are in stations of HVDC-plants (High Voltage Direct Current), in which direct voltage is normally converted into a three-phase alternating voltage or conversely, or in so-called back-to-back stations in which alternating voltage is firstly converted into direct voltage and this is then converted into alternating voltage, as well as in SVCs (Static Var Compensator), in which the direct voltage side consists of capacitors hanging freely. However, the present invention is not restricted to these applications, but other applications are also conceivable, such as in different types of drive systems for machines, vehicles etc.

A Voltage Source Converter of this type is known through for example DE 101 03 031 A1 and WO 2007/023064 A1 and is as disclosed there normally called a multi-cell converter or M2LC. Reference is made to these publications for the functioning of a converter of this type. Said switching cells of the converter may have other appearances than those shown in said publications, and it is for instance possible that each switching cell has more than one said energy storing capacitor, as long as it is possible to control the switching cell to be switched between the two states mentioned in the introduction.

Another Voltage Source Converter of this type is known through U.S. Pat. No. 5,642,275 used in a Static Var Compensator, in which the switching cells have a different appearance in the form of so-called full bridges.

The present invention is primarily, but not exclusively, directed to such Voltage Source Converters configured to transmit high powers, and the case of transmitting high powers will for this reason mainly be discussed hereinafter for illuminating but not in any way restricting the invention thereto. When such a Voltage Source Converter is used to transmit high powers this also means that high voltages are handled, and the voltage of the direct voltage side of the converter is determined by the voltages across said energy storing capacitors of the switching cells. This means that a comparatively high number of such switching cells are to be connected in series for a high number of semiconductor devices, i.e. said semiconductor assemblies, are to be connected in series in each said switching cell, and a Voltage Source Converter of this type is particularly interesting when the number of the switching cells in said phase leg is comparatively high. A high number of such switching cells connected in series means that it will be possible to control these switching cells to change between said first and second switching state and by that already at said phase output obtain an alternating voltage being very close to a sinusoidal voltage. This may be obtained already by means of substantially lower switching frequencies than typically used in known Voltage Source Converters of the type shown in FIG. 1 in DE 101 03 031 A1 having switching cells with at least one semiconductor device of turn-off type and at least one free-wheeling diode connected in anti-parallel therewith. This makes it possible to obtain substantially lower losses and also considerably reduces problems of filtering and harmonic currents and radio interferences, so that equipment therefore may be less costly.

Accordingly, the invention is directed to converters with so-called cascaded half or full bridges.

It is an ongoing attempt to improve such converters already known for instance by reducing the complexity and/or the size thereof.

SUMMARY OF THE INVENTION

The object of the present invention is to provide a Voltage Source Converter of the type defined in the introduction which is in at least some aspect improved with respect to such converters already known.

This object is according to the invention obtained by providing a Voltage Source Converter of the type defined in the introduction, in which the inductance means comprises a plurality of inductors built in in said series connection of switching cells and connected in series with these cells by being connected to said terminals thereof.

The inductance means of a converter of this type has to be there for a number of reasons, such as for obtaining an alternating voltage with a desired shape, possibly avoiding short-circuiting of branches of the series connection of switching cells located on opposite sides of said mid point thereof and so on. These inductance means have in converters of this type already known been provided by arranging a single discrete inductance connecting each half of said series connection of switching cells to the phase output. The present inventors have understood that a said improvement of a Voltage Source Converter of this type may be obtained by modifying the conception of said inductance means and by that obtain possibility to full modularization of the design of the converter when several such converters are to be tailor-made for different applications. The inventors have realized that the total inductance of such phase reactors are proportional to the summary of the voltage of said switching cells and thus may be modularized into steps with said switching cells. Thus, by building in inductors in the series connection of switching cells and connecting them in series with these cells by being connected to said terminals thereof and accordingly integrate the inductances required for the phase leg in question no phase reactors are needed any longer, so that the size and complexity of the converter and by that of a converter station to which it belongs may be reduced, especially for higher voltages and power ratings. Thus, the principle savings and benefits of building in a plurality of inductors in this way consist of reduced foot-print of the converter station and an easier production flow and material handling due to a more modular design.

According to an embodiment of the invention substantially the same number of said inductors are arranged on said series connection of switching cells on both sides of said mid point of the series connection. A modularization is in this way facilitated, and a total inductance necessary for the respective converter may then be obtained based on the understanding that this is proportional to the total voltage of the converter, which depends upon the voltage of the individual switching cells and the numbers thereof.

According to another embodiment of the invention said inductors are substantially uniformly distributed in said series connection of switching cells, which facilitates said modularization even more.

According to another embodiment of the invention said series connection of switching cells is formed by modules of two or more switching cells connected in series, and each such module is provided with at least one said inductor. It may by this be ensured that each such module has an inductance adapted to the voltage to be applied across said module, so that such modules may be used for obtaining different converters tailor-made for different applications.

According to another embodiment of the invention only some of said switching cells in said series connection of switching cells have inductors connected to a terminal thereof. Thus, it is not necessary that each said switching cell has an inductor connected to a terminal thereof, and especially in the case that the converter is made of said modules it may be suitable to have for instance only one such inductor in a module of two, three or more switching cells.

According to another embodiment of the invention each said switching cell of said series connection of switching cells has a said inductor connected to a terminal of this switching cell, which means that a module to be used for building up converters tailor-made for different applications may then be formed by such a switching cell with inductor associated therewith.

According to another embodiment of the invention the converter comprises said inductors formed by an elongated conductor electrically interconnecting adjacent switching cells in said series connection of switching cells while surrounding at least parts of said switching cells by making at least substantially one turn therearound so as to create a dielectric shield around such switching cells. This means that a dielectric shield for the control of the electric field in the area of said switching cell is then automatically formed by building in said inductors into the series connection of switching cells. The use of such an integrated shield/inductance can lower the cost of the converter.

According to another embodiment of the invention a said inductor makes a plurality of turns around parts of switching cells while electrically interconnecting said adjacent switching cells. The inductance added may in this way be adjusted by selecting an appropriate number of turns. The dielectric shield formed by these turns may also be influenced by the number and appearance thereof. It is pointed out that it is not necessary that all conductors interconnecting adjacent switching cells form inductors, but such coils forming dielectric shield inductors may be spaced apart along said series connection of switching cells for making it easier to reach the switching cells for maintenance, replacement thereof and/or other work.

According to another embodiment of the invention each switching cell has more than two said semiconductor assemblies connected in series.

According to another embodiment of the invention the number of the switching cells of said phase leg is $\geq 4$, $\geq 12$, $\geq 30$ or $\geq 50$. A converter of this type is, as already mentioned above, particularly interesting when the number of switching cells of a said phase leg is rather high resulting in a high number of possible levels of the voltage pulses delivered on said phase output.

According to another embodiment of the invention said semiconductor devices of the switching cell assemblies are IGBTs (Insulated Gate Bipolar Transistor), IGCTs (Integrated Gate Commutated Thyristor) or GTOs (Gate Turn-Off thyristor). These are suitable semiconductor devices for such converters, although other semiconductor devices of turn-off type are also conceivable.

According to another embodiment of the invention said converter is configured to have said direct voltage side connected to a direct voltage network for transmitting High Voltage Direct Current (HVDC) and the alternating voltage side connected to an alternating voltage phase line belonging to an alternating voltage network. This is due to the high number of semiconductor assemblies required a particularly interesting application of a converter of this type.

According to another embodiment of the invention the converter is a part of a SVC (Static Var Compensator) with a direct voltage side formed by said energy storing capacitors of the switching cells and the alternating voltage phase output connected to an alternating voltage network.

According to another embodiment of the invention the converter is configured to have a direct voltage across said two poles being 1 kV-1200 kV, 10 kV-1200 kV or 100 kV-1200 kV. The invention is the more interesting the higher said direct voltage is.

The invention also relates to a plant for transmitting electric power according to the appended claim therefor. The stations of such a plant may be given attractive dimensions and a high reliability to a low cost.

Further advantages as well as advantageous features of the invention will appear from the following description.

BRIEF DESCRIPTION OF THE DRAWINGS

With reference to the appended drawings, below follows a description of embodiments of the invention cited as examples.

In the drawings:

FIG. 7 is a very simplified end view of a half, a so-called valve branch, of said series connection of switching cells in a converter according to a third embodiment of the invention, FIG. 8 is a view from above of a part of the valve branch shown in FIG. 7, FIG. 9 is a side elevation of a part of the valve branch shown in FIG. 7.

DETAILED DESCRIPTION OF EMBODIMENTS OF THE INVENTION

Figure 1:
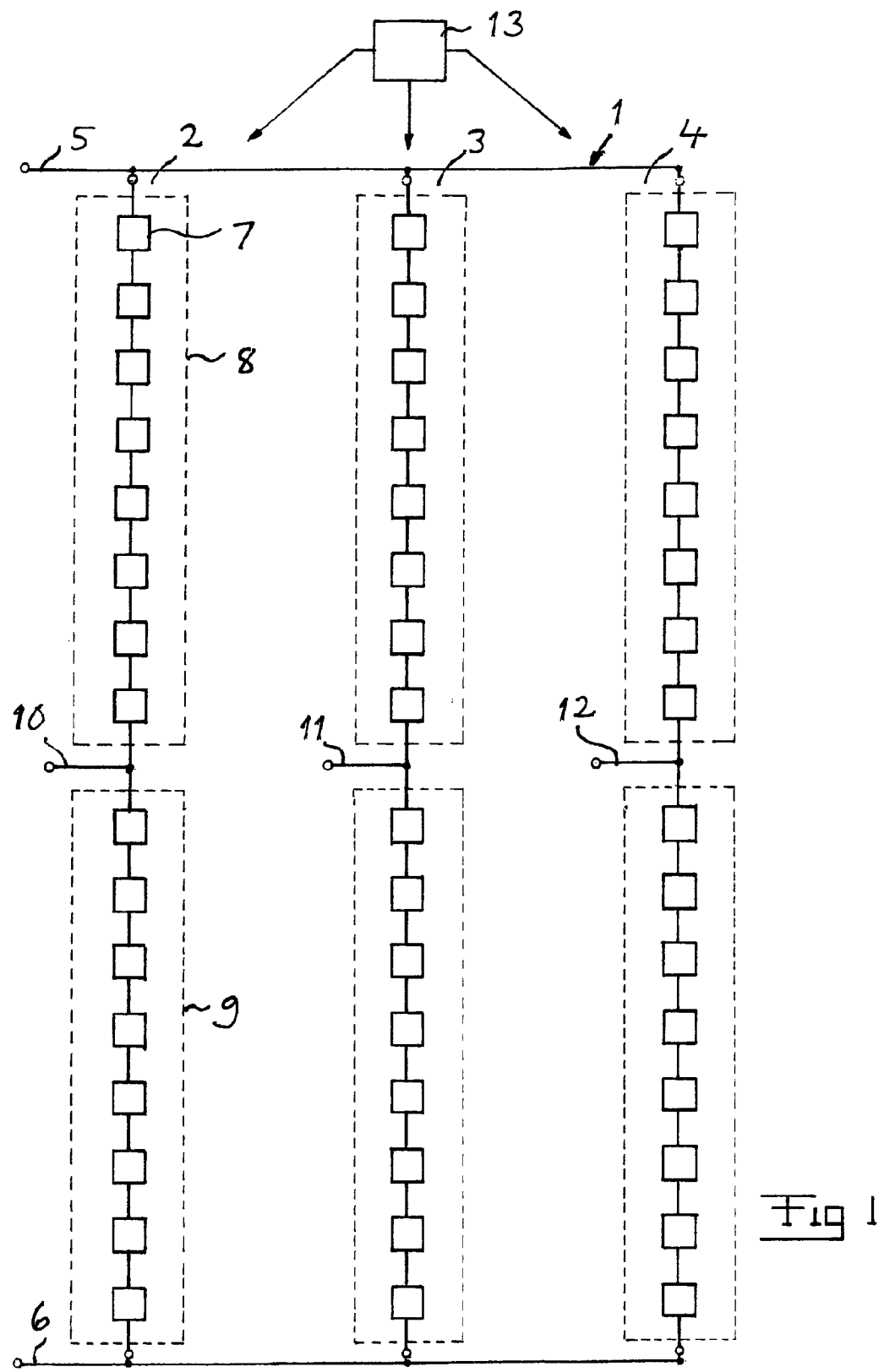
FIG. 1 is a very simplified view of a Voltage Source Converter of the type according to the present invention.

FIG. 1 illustrates very schematically the general construction of a Voltage Source Converter 1 of the type to which the present invention relates. This converter has three phase legs 2-4 connected to opposite poles 5, 6 of a direct voltage side of the converter, such as a direct voltage network for transmitting high voltage direct current. Each phase leg comprises a series connection of switching cells 7 indicated by boxes, in the present case 16 to the number, and this series connection is divided into two equal parts, an upper valve branch 8 and a lower valve branch 9, separated by a mid point 10-12 forming a phase output being configured to be connected to an alternating voltage side of the converter. The phase outputs 10-12 may possibly through a transformer connect to a three phase alternating voltage network, load, etc. Filtering equipment is also arranged on said alternating voltage side for improving the shape of the alternating voltage on said alternating voltage side.

A control arrangement 13 is arranged for controlling the switching cells 7 and by that the converter to convert direct voltage into alternating voltage and conversely.

Figure 2:
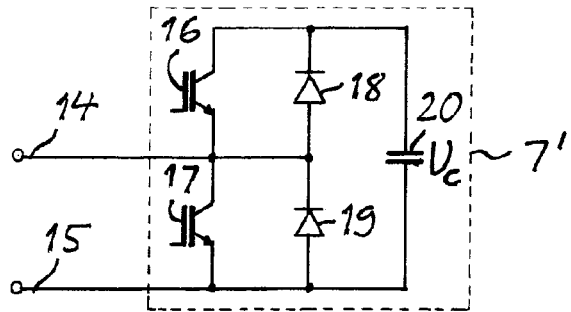
FIGS. 2 and 3 illustrate two different known switching cells, which may be a part of the Voltage Source Converter according to the invention.
Figure 3:
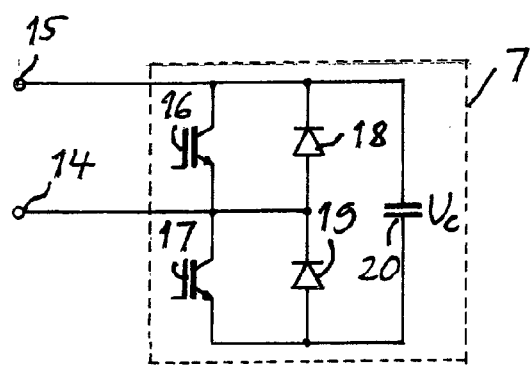

The Voltage Source Converter has switching cells 7 of the type having on one hand at least two semiconductor assemblies with each a semiconductor device of turn-off type, and a free-wheeling diode connected in parallel therewith and on the other at least one energy storing capacitor, and two examples of such switching cells are shown in FIG. 2 and FIG. 3. The terminals 14, 15 of the switching cell are adapted to be connected to adjacent switching cells in the series connection of switching cells forming a phase leg. The semiconductor devices 16, 17 are in this case IGBTs connected in parallel with diodes 18, 19. Although only one semiconductor device and one diode is shown per assembly these may stand for a number of semiconductor devices and diodes, respectively, connected in parallel for sharing the current flowing through the assembly. An energy storing capacitor 20 is connected in parallel with the respective series connection of the diodes and the semiconductor devices. One terminal 14 is connected to the mid point between the two semiconductor devices as well as the mid point between the two diodes. The other terminal 15 is connected to the energy storing capacitor 20, in the embodiment of FIG. 2 to one side thereof and in the embodiment according to FIG. 3 to the other side thereof. It is pointed out that each semiconductor device and each diode as shown in FIG. 2 and FIG. 3 may be more than one connected in series for being able to handle the voltages to be handled, and the semiconductor devices so connected in series may then be controlled simultaneously so as to act as one single semiconductor device.

The switching cells shown in FIG. 2 and FIG. 3 may be controlled to obtain one of a) a first switching state and b) a second switching state, in which for a) the voltage across the capacitor 20 and for b) a zero voltage is applied across the terminals 14, 15. For obtaining the first state in FIG. 2 the semiconductor device 16 is turned on and the semiconductor device 17 turned off and in the embodiment according to FIG. 3 the semiconductor device 17 is turned on and the semiconductor 16 is turned off. The switching cells are switched to the second state by changing the state of the semiconductor devices, so that in the embodiment according to FIG. 2 the semiconductor device 16 is turned off and 17 turned on and in FIG. 3 the semiconductor device 17 is turned off and 16 turned on.

Figure 4:
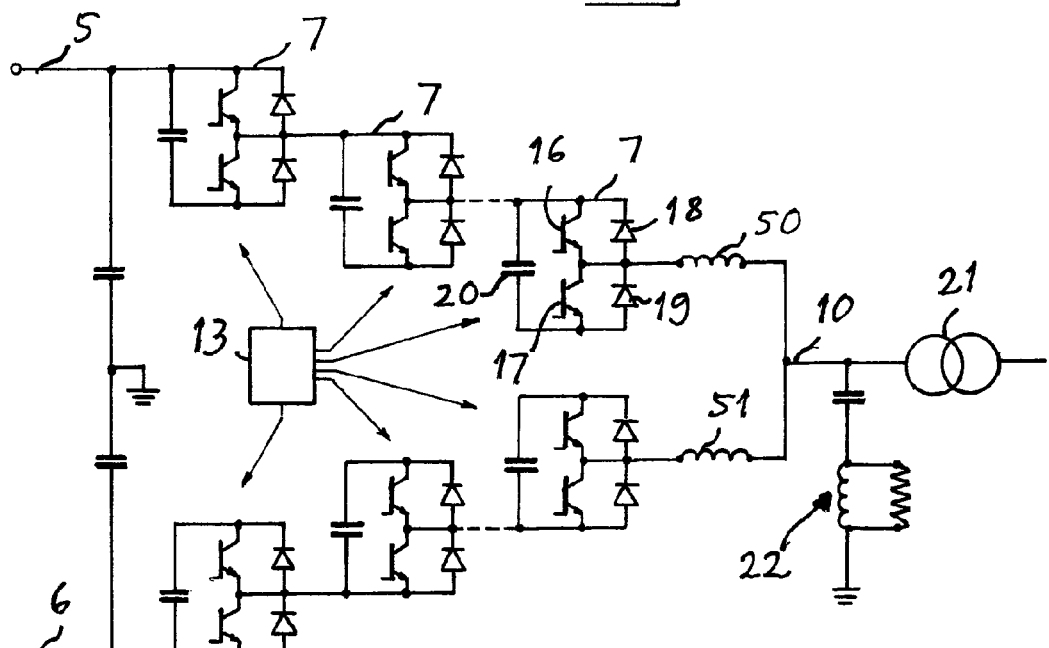
FIG. 4 is a simplified view very schematically illustrating a known Voltage Source Converter of the type according to the present invention.

FIG. 4 shows a little more in detail how a phase leg of the converter according to FIG. 1 is formed by switching cells of the type shown in FIG. 3, in which totally ten switching cells have been left out for simplifying the drawing. The control arrangement 13 is adapted to control the switching cells by controlling the semiconductor devices thereof, so that they will either deliver a zero voltage or the voltage across the capacitor to be added to the voltages of the other switching cells in said series connection. A transformer 21 and filtering equipment 22 are here also indicated. It is shown how each valve branch is through a phase reactor 50, 51 connected to the phase output 10, and such phase reactors should also be there in FIG. 1 for the phase outputs 10, 11 and 12, but have there been left out for simplifying the illustration.

Figure 5:
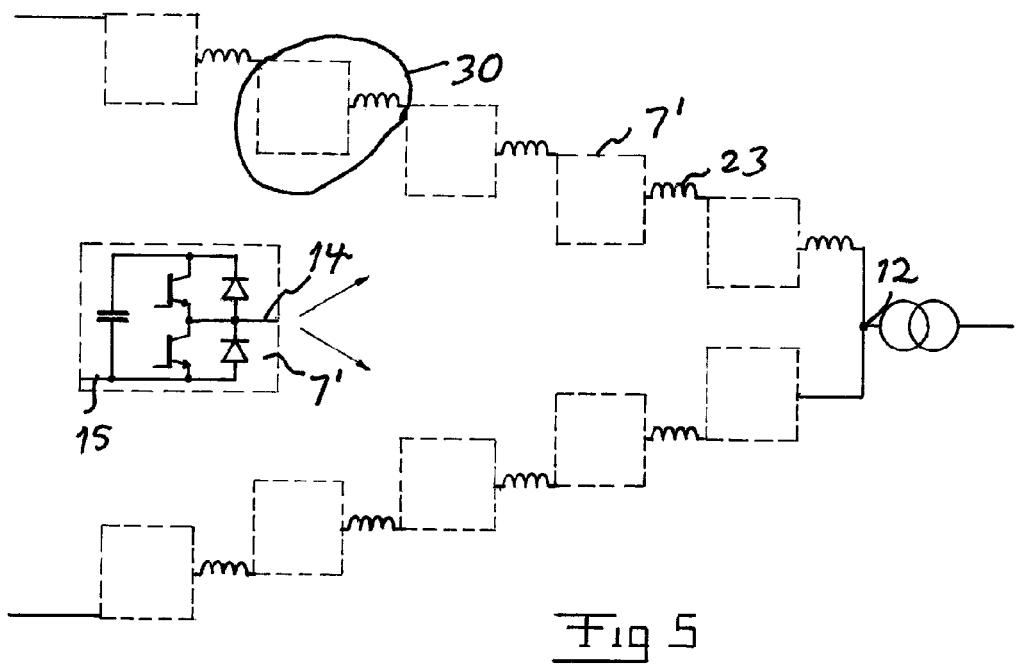
FIG. 5 is a very schematic view corresponding to FIG. 4 of a Voltage Source Converter according to a first embodiment of the present invention.

FIG. 5 illustrates very schematically how the present invention may be realized by replacing the phase reactors of the converter phase leg shown in FIG. 4 by inductors 23 built in in said series connection of switching cells 7', and in this embodiment each switching cell 7' has an inductor connecting to a terminal of this switching cell. Modules 30 of one such switching cell and one inductor may thus be formed and combined into a different number of such modules connected in series in a said phase leg for tailor-making a converter for a certain application intended therefore.

Figure 6:
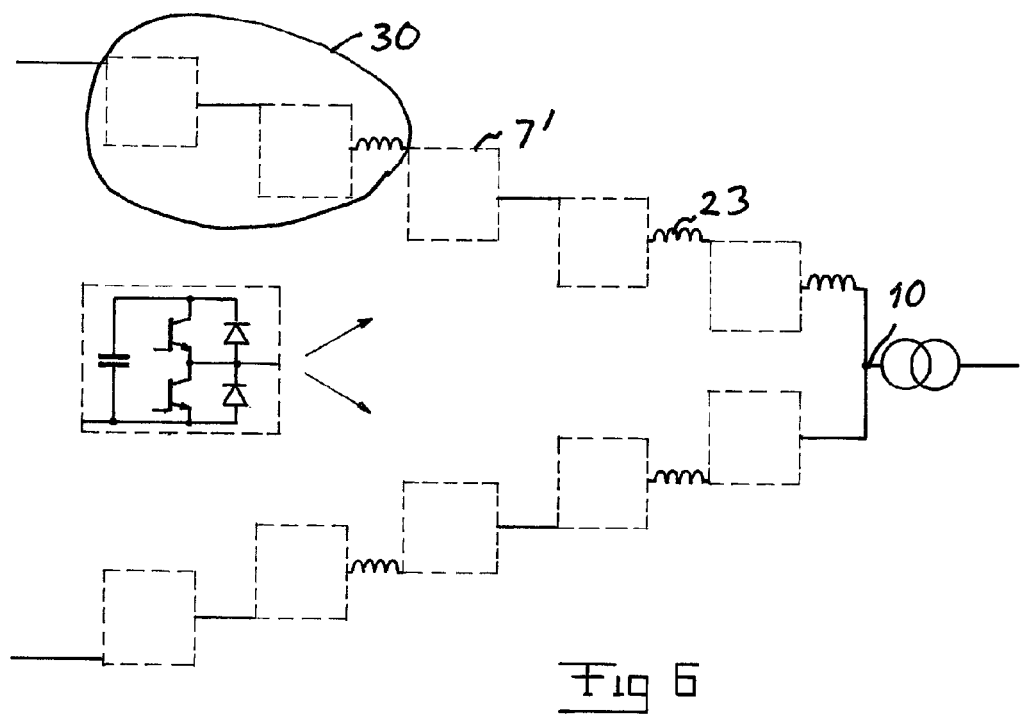
FIG. 6 is a view corresponding to FIG. 5 of a Voltage Source Converter according to a second embodiment of the invention.

FIG. 6 illustrates how inductors 23 may be built in in said series connection of switching cells in another embodiment of the invention, in which an inductor forms the connection of every second switching cell to the next switching cell, whereas every second such connection is made of a simple conductor without any noticeable inductance. It is pointed out that the invention covers any suitable combination of relationship between number of inductors built in in said series connection and the number of switching cells therein. It is then preferred that said inductors are substantially uniformly distributed in said series connection and that substantially the same number of said inductors are arranged in said series connection of switching cells on both sides of the mid point 10 thereof.

FIGS. 7-9 show a little more in detail how such inductors may be built into said series connection of switching cells, in which said semiconductor assemblies of the series connection are illustrated by boxes 24 and the capacitors thereof by greater boxes 25. It is illustrated how an elongated conductor 26 electrically interconnecting adjacent switching cells in said series connection of switching cells forms a said conductor while surrounding at least parts of said switching cells by making at least substantially one turn 27 therearound so as to create a dielectric shield around such switching cells. It is pointed out that the solid line illustrating the turn 27 may just as well stand for a high number of turns of a conductor, such as for instance 300, for obtaining the inductance aimed at. The inductance L may be calculated according to the following formula:

$$L = \frac{\mu_0 N^2 A}{l}$$

in which N is the number of the turns, A is the area circumscribed by said turns and l is the length of the conductor. This will for instance in the case of N=300, A=3 m² and I=15 m result in an inductance L=23 mH.

Accordingly, the inductor built in in this way will then also create a dielectric shield around at least parts of the switching cells and by that be used for controlling the electric field in this region and avoiding electrical breakdowns.

Figures 10, 11:
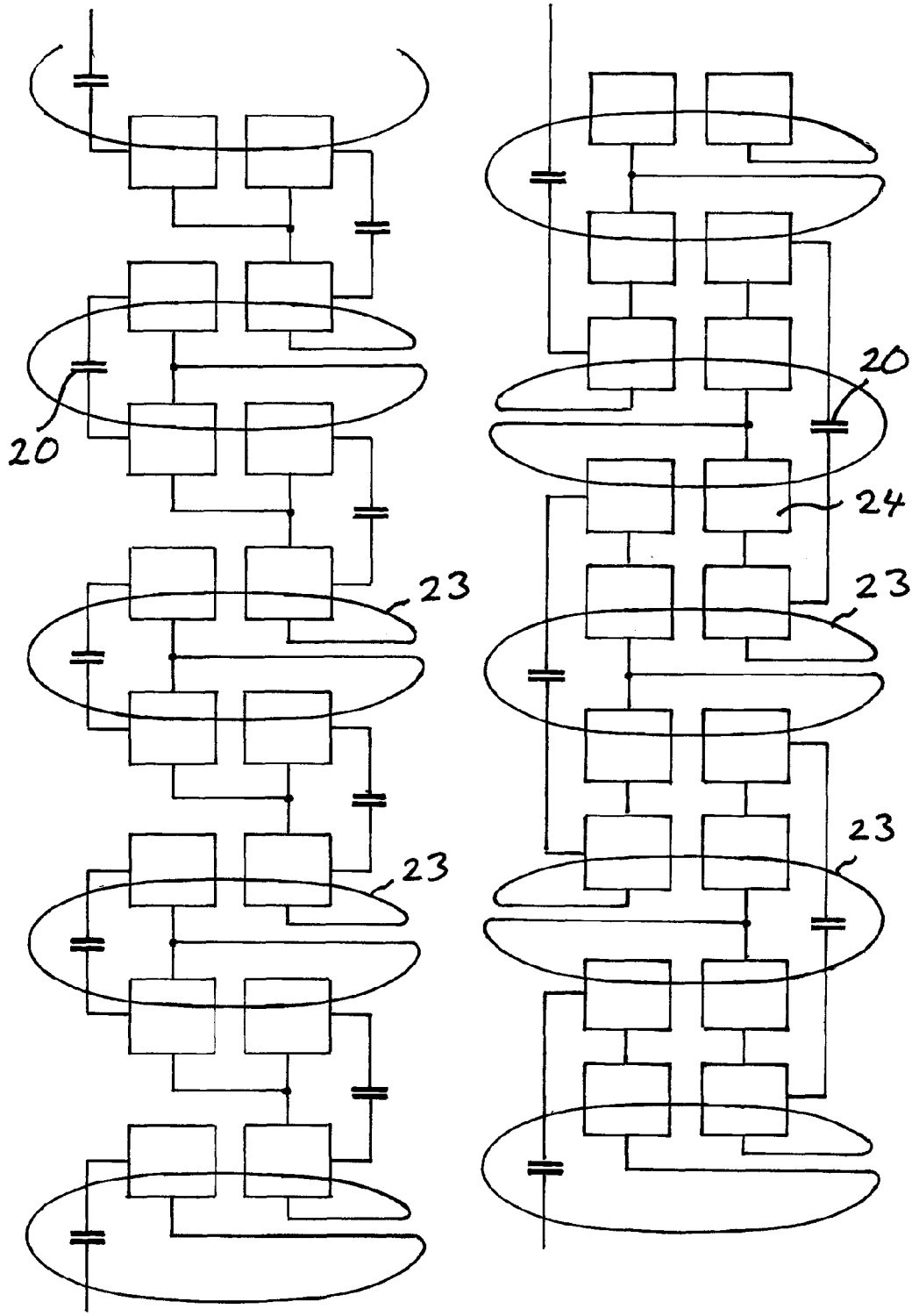
FIG. 10 is a very simplified view illustrating a part of a valve branch in a converter according to fourth embodiment of the invention.
FIG. 11 is a view corresponding to FIG. 10 for a converter according to a fifth embodiment of the invention.

It is schematically illustrated in FIG. 10 how every second switching cell of the series connection of switching cells in a Voltage Source Converter according to the present invention may be interconnected by an inductor 23 of the type illustrated in FIGS. 7-9, which makes it possible to offer easy availability to the different components of said series connection. However, it is well possible to have such inductors between each switching cell as shown in FIGS. 7-9 or to extend the turns made by each conductor forming an inductor over a longer or smaller part of the extension of the series connection for adjusting the dielectric shield properties thereof.

FIG. 11 illustrates an embodiment in which each switching cell of the series connection of switching cells in the Voltage Source Converter has four semiconductor assemblies 24 connected in series, and in this case each switching cell has a said inductor 23 connected to a terminal of the switching cell. A distance possibly desired between adjacent such inductors 23 is still obtained thanks to the higher number of semiconductor assemblies of each switching cell.

The invention is of course not in any way restricted to the embodiments described above, but many possibilities to modifications thereof will be apparent to a person with ordinary skill in the art without departing from the basic idea of the invention as defined in the appended claims.

The invention claimed is:

1. A multi-cell Voltage Source Converter having at least one phase leg connecting to opposite poles of a direct voltage side of the converter and comprising a series connection of switching cells, each said switching cell having on one hand at least two semiconductor assemblies connected in series and having each at least one energy storing capacitor as well as two terminals connecting the cell to adjacent cells in said series connection of switching cells, a mid point of said series connection of switching cells forming a phase output being configured to be connected to an alternating voltage side of the converter, where said series connection of switching cells includes inductance means in the form of a plurality of inductors built in in said series connection of switching cells and connected in series with these cells by being connected to said terminals thereof,
wherein said inductors are formed by an elongated conductor electrically interconnecting adjacent switching cells in said series connection of switching cells while surrounding at least parts of said switching cells by making at least substantially one turn therearound so as to create a dielectric shield around such switching cells.

2. A converter according to claim 1, wherein substantially the same number of said inductors are arranged in said series connection of switching cells on both sides of said mid point of the series connection.

3. A converter according to claim 1, wherein said inductors are substantially uniformly distributed in said series connection of switching cells.

4. A converter according to claim 1, wherein said series connection of switching cells is formed by modules of two or more switching cells connected in series, and each such module is provided with at least one said inductor.

5. A converter according to claim 1, wherein only some of said switching cells in said series connection of switching cells have inductors connected to a terminal thereof.

6. A converter according to claim 1, wherein each said switching cell of said series connection of switching cells has a said inductor connected to a terminal of this switching cell.

7. A converter according to claim 1, wherein a said conductor makes a plurality of turns around parts of switching cells while electrically interconnecting said adjacent switching cells.

8. A converter according to claim 1, wherein each switching cell has more than two said semiconductor assemblies connected in series.

9. A converter according to claim 1, wherein the number of the switching cells of said phase leg is ≧4, ≧12, ≧30 or ≧50.

10. A converter according to claim 1, wherein said semiconductor devices of the switching cell assemblies are IGBTs (Insulated Gate Bipolar Transistor), IGCTs (Integrated Gate Commutated Thyristor) or GTOs (Gate Turn-Off thyristor).

11. A converter according to claim 1, wherein it is configured to have said direct voltage side connected to a direct voltage network for transmitting High Voltage Direct Current (HVDC) and the alternating voltage side connected to an alternating voltage phase line belonging to an alternating voltage network.

12. A converter according to claim 1, wherein it is a part of a SVC (Static Var Compensator) with a direct voltage side formed by said energy storing capacitors of the switching cells and the alternating voltage phase output connected to an alternating voltage network.

13. A converter according to claim 1, wherein it is configured to have a direct voltage across said two poles being 1 kV-1200 kV, 10 kV-1200 kV or 100 kV-1200 kV.

14. A plant for transmitting electric power comprising a direct voltage network and at least one alternating voltage network connected thereto through a station, said station being adapted to perform transmitting of electric power between the direct voltage network and the alternating voltage network and comprises at least one Voltage Source Converter adapted to convert direct voltage into alternating voltage and conversely, wherein that said station of the plant comprises a Voltage Source Converter according to claim 1.

15. A converter according to claim 2, wherein said inductors are substantially uniformly distributed in said series connection of switching cells.

16. A converter according to claim 2, wherein said series connection of switching cells is formed by modules of two or more switching cells connected in series, and that each such module is provided with at least one said inductor.

17. A converter according to claim 3, wherein said series connection of switching cells is formed by modules of two or more switching cells connected in series, and each such module is provided with at least one said inductor.

18. A converter according to claim 2, wherein each said switching cell of said series connection of switching cells has a said inductor connected to a terminal of this switching cell.

19. A converter according to claim 3, wherein each said switching cell of said series connection of switching cells has a said inductor connected to a terminal of this switching cell.

20. A converter according to claim 4, wherein each said switching cell of said series connection of switching cells has a said inductor connected to a terminal of this switching cell.

* * * * *